3,096,364
PRODUCTION OF BENZYL ALKYL PHTHALATES BY ESTER INTERCHANGE

Harry R. Gamrath, St. Louis, and Louis O. Raether, Webster Groves, Mo., assignors to Monsanto Chemical Company, St. Louis, Mo., a corporation of Delaware
No Drawing. Filed Dec. 8, 1958, Ser. No. 778,628
7 Claims. (Cl. 260—475)

This invention relates to a novel process for producing esters of the structure (I)  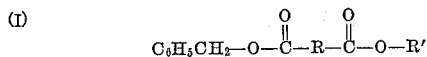
$$C_6H_5CH_2-O-\overset{O}{\underset{\|}{C}}-R-\overset{O}{\underset{\|}{C}}-O-R'$$

wherein R is an arylene radical and R′ is derived from a monohydric alcohol of the structure, R′OH, and is selected from alkyl, alkylene and substituted alicyclic radicals, said alcohol having a boiling point above the boiling point of benzyl alcohol.

The prior art teaches that an alcoholysis reaction results in the alkoxy portion of a higher boiling alcohol displacing the alkoxy portion of any ester group if the displaced alkoxy portion forms an alcohol having a boiling point below that of the displacing alcohol. Thus it would be expected that if the displacing alcohol had a boiling point higher than the alcohols which would be formed from displacement of the alkoxy groups in both ester groups of a neutral diester of any arylene dibasic acid, there would be formed a neutral diester in which both ester groups were derived from the displacing alcohol. We have now found, however, that in the case of unsymmetrical esters of aryl dicarboxylic acids of the structure (II)  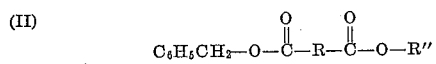
$$C_6H_5CH_2-O-\overset{O}{\underset{\|}{C}}-R-\overset{O}{\underset{\|}{C}}-O-R''$$

wherein R is as described above and R″ is selected from alkyl, cycloalkyl, alkylene and substituted alicyclic radicals, where such unsymmetrical esters are subjected to an alcoholysis reaction with alcohols having a boiling point above benzyl alcohol and above the alcohol which would be formed from displacement of the R″O— radical, only the R″O— radical is displaced and the benzyloxy radical is not displaced, and thus no benzyl alcohol is formed. Accordingly, the products of such an alcoholysis reaction correspond to the esters of structure I above.

It is an object of this invention, therefore, to provide a novel method for preparing unsymmetrical benzyl esters as described above from other unsymmetrical benzyl esters, just described, by an alcoholysis reaction in which the displacing alcohol has a boiling point above benzyl alcohol, i.e., above about 205° C.

Thus, in accordance with our invention, it has been found that esters of structure I above can be readily and efficiently prepared by heating an alcohol of the structure,

R′OH wherein R′ is as described above, with an ester of structure II above, and the corresponding alcohol, R″OH, which is displaced has a boiling point lower than said alcohol of the structure, R′OH.

The following non-limiting examples illustrate the improved process of this invention.

EXAMPLE I

Benzyl n-Decyl Phthalate

A suitable reaction vessel was charged with one mol of butyl benzyl phthalate, one mol of n-decanol having a boiling point of 233° C. as the exchange alcohol, and 1.1% by weight, with reference to the butyl benzyl phthalate, of sodium methoxide as a catalyst. Heat was then applied to the reaction vessel until the temperature was slowly raised to 140° C. At this temperature the system was slowly evacuated to about 130 mm. of mercury pressure, under which conditions the displaced alcohol began to distill from the mass. The pressure was then decreased until all the displaced alcohol was removed, which took about 3¼ hours, at which time the pressure was 50 mm. and the temperature was 150° C.

After cooling, the reaction mass was washed with water to remove the catalyst and the residual alkalinity. Thereafter the ester product was steamed, treated with an alkaline water wash, and washed again with water. The ester was then dried by heating under vacuum, leaving benzyl n-decyl phthalate in a 93% yield in terms of the starting ester. Properties of the benzyl n-decyl phthalate were specific gravity at 25° C. of 1.0306 and $n_D^{25}$ of 1.5141.

EXAMPLE II

Benzyl 5-Ethyl-2-Nonyl Phthalate

Generally following the procedure of Example I, about one mol of 5-ethyl-2-nonanol boiling at about 225° C. and 1.6% by weight of flaked NaOH as catalyst were used to prepare benzyl 5-ethyl-2-nonylphthalate in a yield of 91%, having a specific gravity at 25° C. of 1.0306.

EXAMPLE III

Benzyl Isodecyl Phthalate

Generally following the procedure of Example I, about 1.2 mols of isodecanol, obtained from an Oxo process and having a boiling point of about 216–220° C., and 1.3% by weight of flaked NaOH as catalyst were used to prepare benzyl isodecyl phthalate, having a specific gravity at 25° C. of 1.0402, in a yield of 93%.

EXAMPLE IV

Benzyl 2-Methyl-7-Ethyl-4-Undecyl Phthalate

Generally following the procedure of Example I, but using as the exchange alcohol 2-methyl-7-ethyl-4-undecanol having a boiling point of about 264° C., and 1.2% by weight of NaOH as catalyst, there was prepared benzyl 2-methyl-7-ethyl-4-undecyl phthalate, which had a specific gravity at 25° C. of 1.0228, in a yield of 88.7%.

EXAMPLE V

Benzyl Tridecyl Phthalate

Generally following the procedure of Example I, but using as the exchange alcohol a tridecanol obtained from an Oxo process and having a boiling point of about 264° C., and 1.2% by weight of NaOH as catalyst, there was prepared benzyl tridecyl phthalate, which had a specific gravity at 25° C. of 1.0238, in a yield of 93%.

EXAMPLE VI

Benzyl Tridecyl Phthalate

In a manner similar to Example I, using as starting ester benzyl capryl phthalate, as the exchange alcohol the tridecanol used in Example V, and 0.65% by weight of NaOMe as catalyst, we prepared benzyl tridecyl phthalate, which had a specific gravity 25/25° C. of 1.0240, in a yield of 88.2%.

EXAMPLE VII

Benzyl Octadecyl Phthalate

In the manner of Example I, using as the exchange alcohol octadecanol having a boiling point of about 200° C. at 15 mm. of mercury, and 0.65% by weight of NaOMe as catalyst, benzyl octadecyl phthalate was prepared, which had a specific gravity 25/25° C. of 0.9940, in a yield of 92%.

EXAMPLE VIII

Benzyl 2,6,8-Trimethyl-4-Nonyl Phthalate

Generally following the procedure of Example I, using as the exchange alcohol 2,6,8-trimethyl-4-nonanol which had a boiling point of about 258° C., and 0.65% by weight of NaOCH₃ as catalyst, we prepared benzyl 2,6,8-trimethyl-4-nonyl phthalate, which had a specific gravity at 25° C. of 1.0288, in a yield of 90%.

EXAMPLE IX

Benzyl Octylcyclohexyl Phthalate

Generally following the procedure of Example I, we prepared benzyl octylcyclohexyl phthalate from benzyl butyl phthalate and octylcyclohexanol. The particular octylcyclohexanol used, which boiled at about 100–105° C. at 0.45 mm. of mercury, was obtained from the hydrogenation of octylphenol in which there was present both the 4-octyl and 2-octyl isomers in a ratio of about 20:1, respectively. Thus the octylcyclohexanol used also contained the 4-octyl and 2-octyl isomers, also in about the same ratio as in the phenol. In particular, about 1.1 mols of the displacing alcohol was used along with about 0.7% by weight of sodium hydroxide as catalyst. The resulting product, benzyl octylcyclohexyl phthalate, was obtained in the usual high yields (about 88%) and had a specific gravity of about 1.013 at 25/25° C.

EXAMPLE X

Benzyl Oleyl Phthalate

Generally following the procedure of Example I, using as the exchange alcohol oleyl alcohol which had a boiling point of about 210° C. at 15 mm. of mercury, and 0.65% by weight of NaOMe as catalyst, there was prepared benzyl oleyl phthalate, which had a specific gravity at 25° C. of 0.9839, in a yield of 91%.

EXAMPLE XI

Benzyl 2-(2-Ethylhexoxy)Ethyl Phthalate

In a manner similar to the procedure of Example I, using as the exchange alcohol 2-(2-ethylhexoxy)ethanol which had a boiling point of about 259° C., and 0.60% by weight of NaOMe as catalyst, there was prepared benzyl 2-(2-ethylhexoxy)ethyl phthalate, which had a specific gravity at 25° C. of 1.0630, in a yield of 92%.

Although acidic or basic catalysts can be used for the reaction, sodium hydroxide is the preferred catalyst, but other basic materials, such as potassium hydroxide and sodium or potassium alcoholates of methyl, ethyl and butyl alcohols, may be employed. Of course, a catalyst need not be employed, at least in theory, but without a catalyst the reaction times necessary to get commercially attractive yields are prohibitive. In the examples given, an approximately 1:1 molar ratio of the benzyl butyl phthalate and the exchange alcohol was used. However, a larger excess of the exchange alcohol may be used, which results in an increase in the yield of the desired ester without affecting the benzyl group.

Since changes in the process may be made without departing from the scope or spirit of the invention, it is intended that the above examples be interpreted as illustrative only. Thus, other starting esters than benzyl butyl phthalate and benzyl capryl phthalate may be used, such as benzyl methyl phthalate, benzyl propyl phthalate, benzyl cyclohexyl phthalate, and the like.

This application is a continuation-in-part of our earlier-filed application, Serial Number 714,958, filed February 13, 1958, and now abandoned.

What is claimed is:

1. In a process for producing a benzyl phthalate of the formula

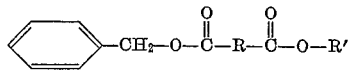

where R is o-phenylene and R′ is selected from the group consisting of alkyl, alkenyl and alkyl-substituted alicyclic of from about ten to about twenty carbon atoms, the steps comprising heating a mixture of an alcohol of the structure R′OH, said alcohol having a boiling point above the boiling point of benzyl alcohol, and a benzyl phthalate of the formula

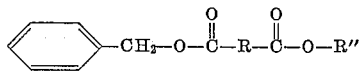

where R is o-phenylene and R″ is selected from the group consisting of alkyl, alicyclic and alkenyl of up to about twenty carbon atoms, to form said phthalate of the formula

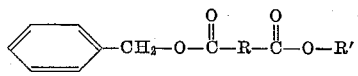

and an alcohol of the structure, R″OH, which boils below said alcohol, R′OH, and removing said alcohol, R″OH, from said mixture.

2. In a process for producing a benzyl phthalate of the formula

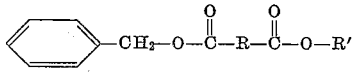

where R is o-phenylene and R′ is alkyl of from about ten to about twenty carbon atoms, the steps comprising heating a mixture of an alcohol of the structure, R′OH, said alcohol having a boiling point above the boiling point of benzyl alcohol, and a benzyl phthalate of the formula

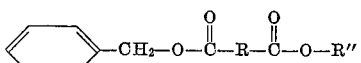

where R is o-phenylene and R″ is alkyl of up to about twenty carbon atoms, to form said phthalate of the formula

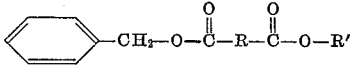

and an alcohol of the structure, R″OH, which boils below said alcohol, R′OH, and removing said alcohol, R″OH, from said mixture.

3. In a process for producing a benzyl phthalate of the formula

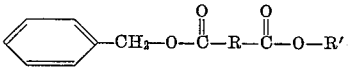

where R is o-phenylene and R′ is alkenyl of from about ten to about twenty carbon atoms, the steps comprising heating a mixture of an alcohol of the structure, R′OH, said alcohol having a boiling point above the boiling point of benzyl alcohol, and a benzyl phthalate of the formula

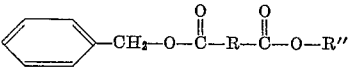

where R is o-phenylene and R″ is alkyl of up to about twenty carbon atoms, to form said phthalate of the formula

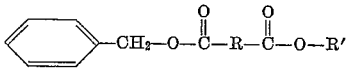

and an alcohol of the structure, R″OH, which boils below said alcohol, R′OH, and removing said alcohol, R″OH, from said mixture.

4. In a process for producing a benzyl phthalate of the formula

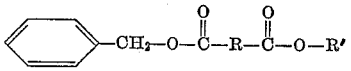

where R is o-phenylene and R' is an alkyl-substituted alicyclic of from about ten to about twenty carbon atoms, the steps comprising heating a mixture of an alcohol of the structure, R'OH, said alcohol having a boiling point above the boiling point of benzyl alcohol, and a benzyl phthalate of the formula

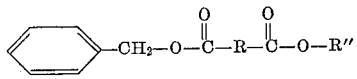

where R is o-phenylene and R'' is alkyl of up to about twenty carbon atoms, to form said phthalate of the formula

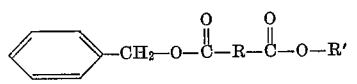

and an alcohol of the structure, R''OH, which boils below said alcohol, R'OH, and removing said alcohol, R''OH, from said mixture.

5. In a process for producing benzyl decyl phthalate by an alcoholysis reaction, the steps comprising heating a mixture of decyl alcohol and benzyl butyl phthalate, thus forming said benzyl decyl phthalate and butanol, and removing butanol from said mixture.

6. In a process for producing benzyl tridecyl phthalate by an alcoholysis reaction, the steps comprising heating a mixture of tridecyl alcohol and benzyl butyl phthalate, thus forming said benzyl tridecyl phthalate and butanol, and removing butanol from said mixture.

7. In a process for producing benzyl oleyl phthalate by an alcoholysis reaction, the steps comprising heating a mixture of oleyl alcohol and benzyl butyl phthalate, thus forming said benzyl oleyl phthalate and butanol, and removing butanol from said mixture.

References Cited in the file of this patent

UNITED STATES PATENTS

| | | |
|---|---|---|
| 1,984,283 | Reid et al. | Dec. 11, 1934 |
| 1,993,737 | Graves | Mar. 12, 1935 |
| 2,047,664 | Barrett | July 14, 1936 |

FOREIGN PATENTS

| | | |
|---|---|---|
| 654,842 | Great Britain | July 4, 1951 |

OTHER REFERENCES

Fieser: Introduction to Organic Chemistry, page 141 (1957).

Groggins: Unit Processes in Organic Synthesis, pages 710–4 (1958).